United States Patent [19]

Tsuchiya

[11] Patent Number: 5,598,745
[45] Date of Patent: Feb. 4, 1997

[54] FLYWHEEL WITH FRICTION GENERATING DEVICE

[75] Inventor: Shouichi Tsuchiya, Atsugi, Japan

[73] Assignee: Unisia Jecs Corporation, Atsugi, Japan

[21] Appl. No.: 249,309

[22] Filed: May 26, 1994

[30] Foreign Application Priority Data

May 26, 1993 [JP] Japan .................. 5-027569 U

[51] Int. Cl.$^6$ ........................................ G05G 1/00
[52] U.S. Cl. .................. 74/574; 74/572; 74/573 R; 192/213.11
[58] Field of Search ................ 74/572–574; 464/67, 464/68; 192/106.2

[56] References Cited

U.S. PATENT DOCUMENTS

| | | | |
|---|---|---|---|
| 4,220,233 | 9/1980 | Ban et al. | 192/106.2 |
| 4,289,220 | 9/1981 | Onuma et al. | 192/106.2 X |
| 4,431,100 | 2/1984 | Kajikawa et al. | 192/106.2 |
| 4,538,718 | 9/1985 | Maucher | 464/68 X |
| 4,640,402 | 2/1987 | Hartig et al. | 192/106.2 |
| 4,782,933 | 11/1988 | Jäckel et al. | 192/70.18 |
| 4,887,485 | 12/1989 | Kobayashi et al. | 74/574 |
| 4,904,225 | 2/1990 | Womer et al. | 464/67 |
| 5,139,124 | 8/1992 | Friedmann | 192/48.3 |
| 5,245,889 | 9/1993 | Kohno et al. | 74/573 R |

FOREIGN PATENT DOCUMENTS

| | | | |
|---|---|---|---|
| 4327017 | 3/1994 | Germany | 74/572 |
| 2269883 | 2/1994 | United Kingdom | 74/572 |

*Primary Examiner*—Vinh T. Luong
*Attorney, Agent, or Firm*—Foley & Lardner

[57] ABSTRACT

Friction blocks are held between a driver plate and a friction ring fixedly held on a side plate using a plate spring, and are received in circumferentially spaced windows of an annular disc. The annular disc is affixed to a torque converter cover and disposed between the driver and side plates both of which are secured to an engine crankshaft. The friction blocks have, within the windows, a play in the circumferential direction of the annular disc. The annular disc is resiliently coupled with the driver and side plates by coil springs operatively disposed in corresponding windows of the driver plate, side plate, and the annular disc. Rotation of the driver and side plates relative to the annular disc far enough to consume the circumferential play of the friction blocks in the corresponding windows causes the annular disc to entrain all of the friction blocks in its further movement. Relative mobility of the friction blocks to each other in the circumferential direction of the annular disc is restricted by two floating rings, the first of which is disposed between the annular disc and the friction ring and the second of which is disposed between the annular disc and the driver plate.

11 Claims, 6 Drawing Sheets

FLYWHEEL WITH FRICTION GENERATING DEVICE

BACKGROUND OF THE INVENTION

The present invention relates to a flywheel of the type having flywheel elements resiliently coupled by a spring arrangement and a friction generating device.

U.S. Pat. No. 4,904,225 issued to Worner et al., on Feb. 27, 1990 discloses flywheel elements coupled by a spring arrangement. The spring arrangement has an intermediate support which is connected resiliently to one flywheel element by long-stroke arcuate helicoidal springs and to the other flywheel element by short-stroke springs. Additionally, a slip coupling which exhibits play is also arranged. The slip coupling is operative to generate friction resistance which counteracts the movement of the flywheel elements.

An object of the present invention is to provide a flywheel with improved operational behaviour of a friction generating device with reduced manufacturing cost.

SUMMARY OF THE INVENTION

According to the present invention, there is provided a flywheel comprising:

first and second flywheel elements which are resiliently coupled by a spring arrangement; and a friction generating device, wherein one of said first and second flywheel elements has a radially extending wall, and said friction generating device includes a plurality of friction blocks received by the other one of said first and second flywheel elements with play in the circumferential direction of said the other flywheel element, means on said one flywheel element for biasing said plurality of friction blocks against said radially extending wall, and means for restricting at least circumferential relative mobility of said plurality of friction blocks to each other.

DETAILED DESCRIPTION OF THE INVENTION

Referring to FIGS. 1 to 6, there is shown a flywheel 20 which comprises two coaxial flywheel elements, namely a driver flywheel element 22 and a driven flywheel element 24, which are resiliently coupled together by a spring arrangement 26. The driver flywheel element 22 is affixed to a crankshaft 28 of an internal combustion engine by a set of axially parallel bolts 30, and the driven flywheel element 24 can transmit torque to an input element (converter cover) 32 of a torque converter which can in turn transmit torque to an input element (turbine shaft) of an automatic transmission, not shown. The converter cover 32 is drivingly connected to a pump impeller, not shown, of the torque converter in a known manner, and has at its center a circular protuberance 34 received in a central opening 36 of the crankshaft 28 by means of a bushing 38.

The driver flywheel element 22 includes two annular plates, namely, a first or driver plate 40 and a second or side plate 42, while the driven flywheel element 24 includes an annular disc 44. The driver and side plates 40, 42 have their radially innermost portions secured to an annular axial end of the crankshaft 28 around the central opening 36. The driver plate 40 carries at its rim 46 a ring gear 48 adapted to mate with an output gear of a starter motor, not shown. The side plate 42 has an axially extending collar portion 50 adjacent its radially innermost portion. The driver and side plates 40, 42 are fixedly secured to each other by a set of distancing elements in the form of rivets 52. The rivets 52 ensure that the plates 40, 42 are held at a predetermined axial distance from each other. Received by the space between the driver and side plates 40, 42 is the annular disc 44 having its inner periphery facing and opposed to axially extending surface of the collar portion 50. The annular disc 44 is formed with a set of circumferentially spaced arcuate slots 54 receiving the rivets 52, respectively. The annular disc 44 is affixed to the converter cover 32 by a set of bolts 56 threadedly engaged with tapped rings 58 fixedly secured to the converter cover 32. The bolts 56 and arcuate slots 54 are alternately arranged. Coaxial relation between the flywheel elements 22, 24 is maintained by the bushing 38 rotatably supporting the converter cover 32. No bearing is thereby used between the flywheel elements 22, 24.

Figure 2:
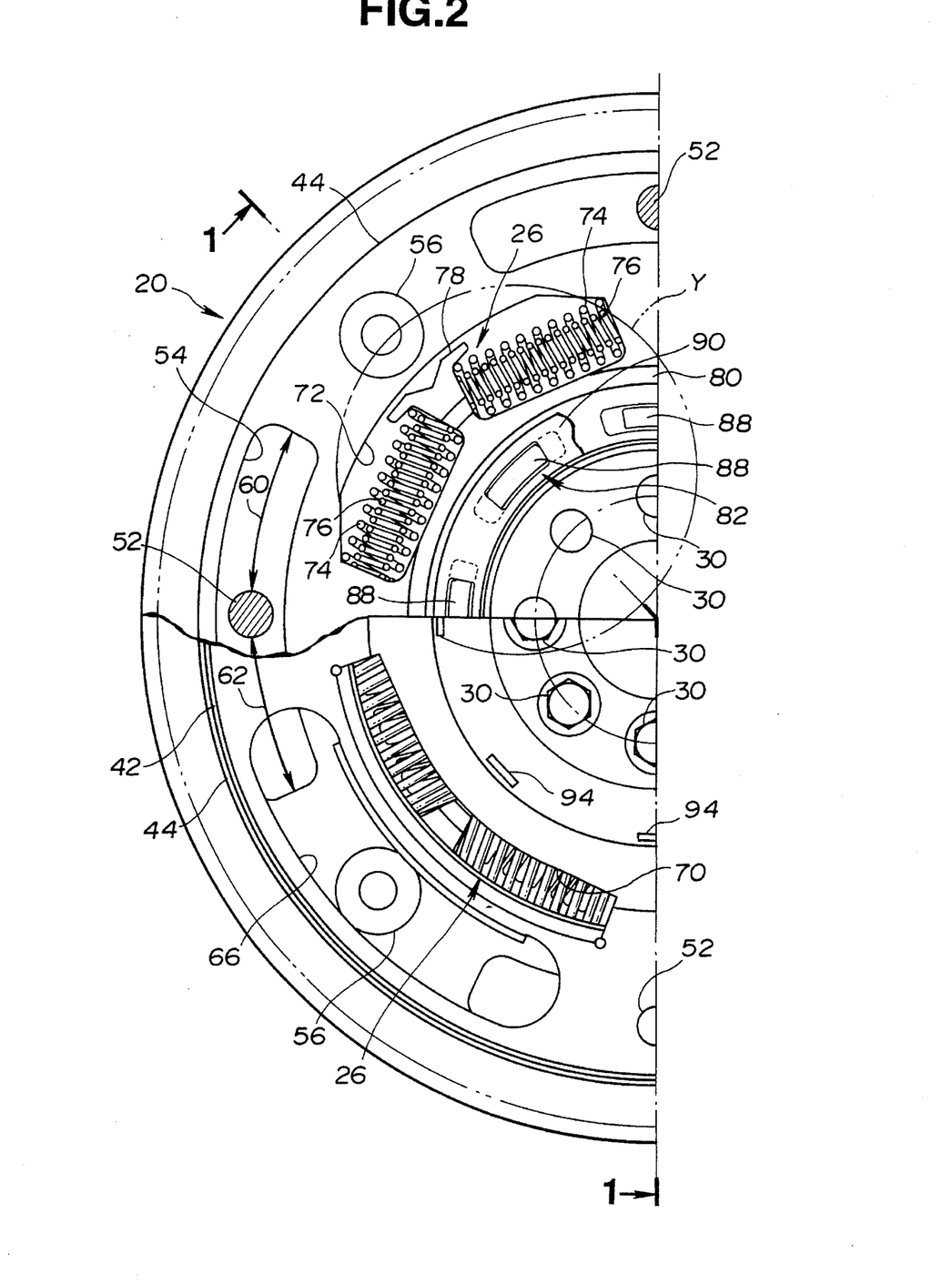
FIG. 2 is a fragmentary elevational view of the flywheel as seen in the direction of arrow 2 in FIG. 2 with a converter cover and a part of a driven flywheel element omitted.

The flywheel elements 22, 24 are rotatable relative to each other within an angle corresponding to the gap 60+62 (see FIG. 2). The driver and side plates 40, 42 are formed with openings 64, 66, respectively, to avoid interference between the plates 40, 42 and the bolts and rings 56, 58 during the relative rotation between the flywheel elements 22, 24.

The plates 40, 42 are formed with windows 68, 70 which register with windows 72 in the disc 44 to receive energy storing elements in the form of coil springs 74, 76. Extending into the windows 72 in the disc 44 are radially projecting arms 78 of a floating type spring retainer ring 80. As best seen in FIG. 2, each of the windows 72 receives a set of coil springs 74 which are separated by the corresponding arm 78. Also received in each of the windows 72 are a set of coil springs 76 which are disposed in the corresponding coil springs 74 and separated by the corresponding arm 78. These coil springs 74 and 76 are received in the windows 68, 70 of the plates 40, 42 too, and oppose angular displacements of the plates 40, 42 relative to the disc 44 and vice versa. The windows 68, 70 of the plates 40, 42, windows 72 in the disc 44, coil springs 74 and 76 and spring retainer ring 80 thereby constitute the spring arrangement 26 which resiliently couples the flywheel elements 22, 24.

Figure 1:
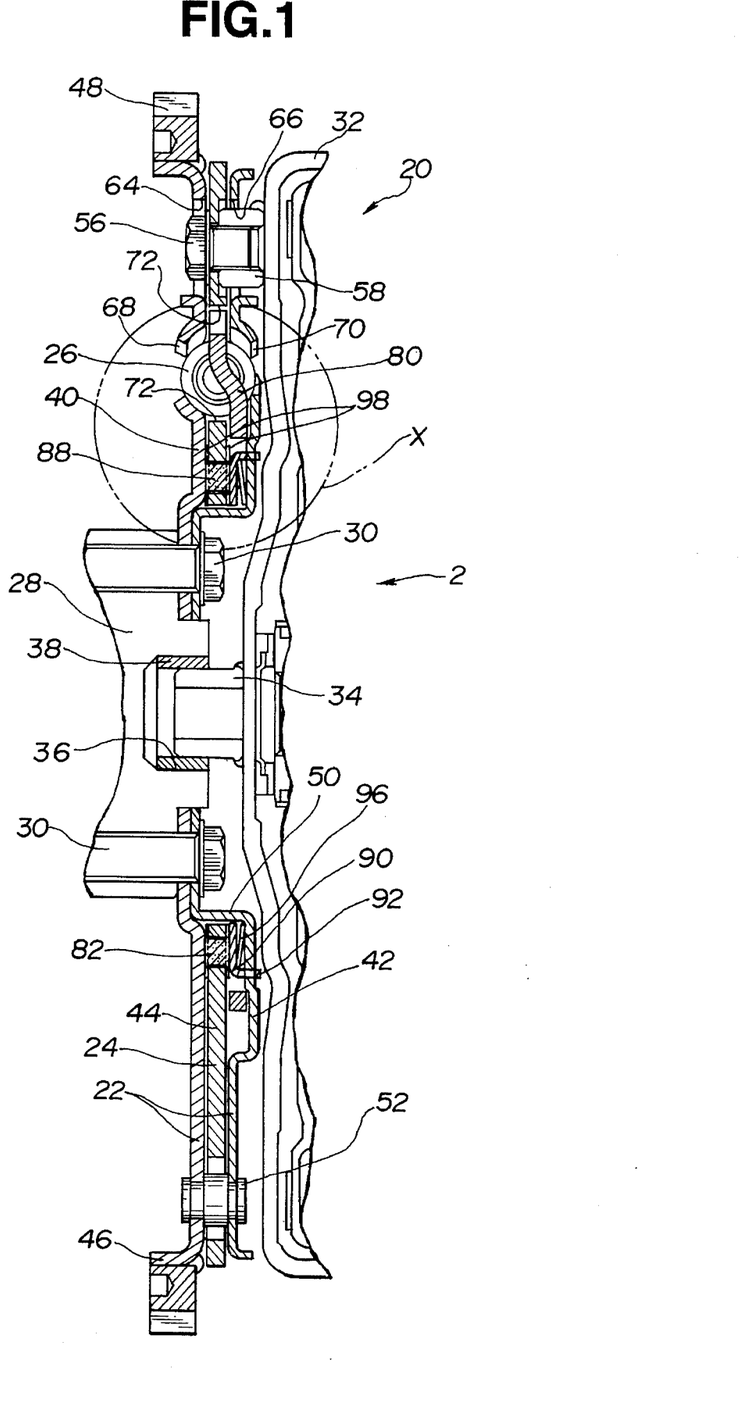
FIG. 1 is an axial section taken through the line 1—1 in FIG. 2, showing a preferred embodiment of a flywheel according to the present invention.
Figure 3:
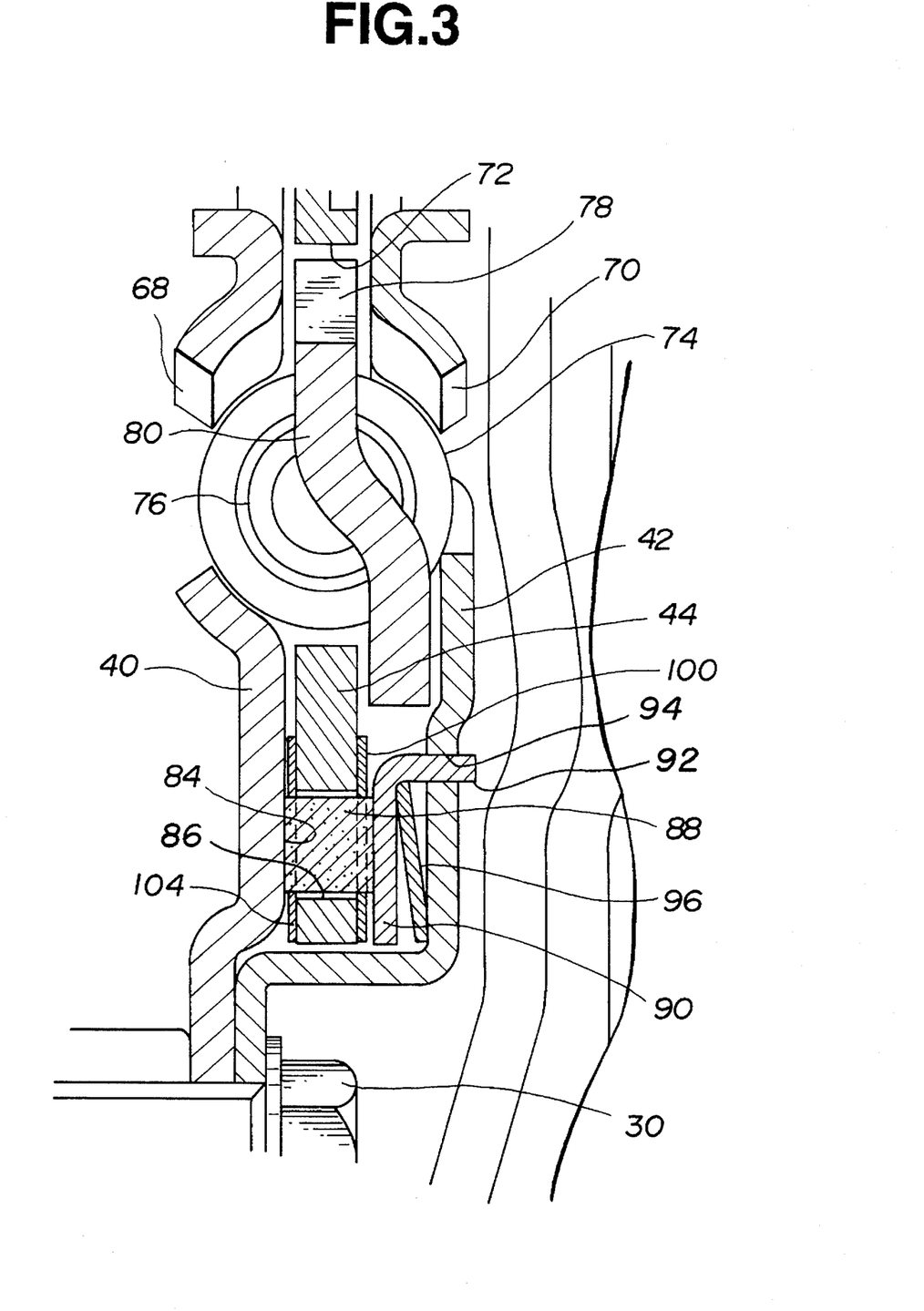
FIG. 3 is an enlarged view of the detail within the phantom-line circle "X" in FIG. 1.
Figure 4:
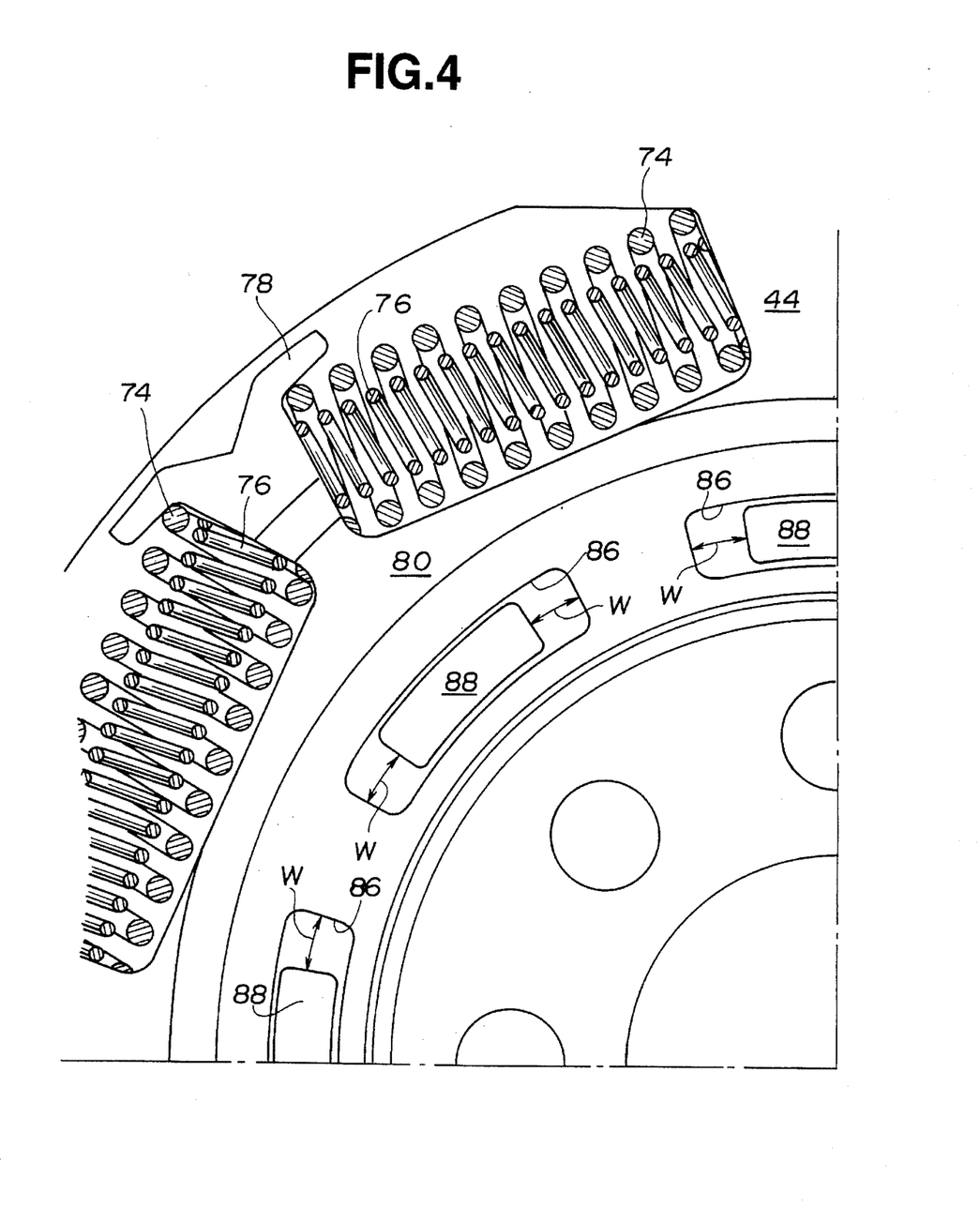
FIG. 4 is an enlarged view of the detail within the phantom-line circle "Y" in FIG. 2.

The flywheel 20 further comprises a friction generating device 82 (see FIG. 1). The device 82, as shown in FIGS. 3 and 4, surrounds the collar portion 50 of the driver flywheel element 22 and is disposed between a radially extending wall or surface 84 of the driver plate 40 and an inner face of the side plate 42. The annular disc 44 has on its internal circumference portion, which surrounds the collar portion 50 and is disposed between the radially extending wall 84 and the inner face of the side plate 42, windows 86 which receive friction blocks 88. The friction blocks 88 have, within the windows 86, a play 2 x W in the circumferential direction of the disc 44. The friction blocks 88 within the windows 86 abut the radially extending wall 84 of the driver plate 40. The friction blocks 88 cooperate by their end faces remote from the radially extending wall 84 with a friction ring 90. The friction ring 90 is arranged axially slidably on the collar portion 50 and maintained firmly against rotation relative to the driver flywheel element 22 by means of lugs 92 at the periphery of the friction ring 90. The lugs 92 engage into slots 94 in the side plate 42. An annular plate spring 96 is clamped axially between the side plate 42 of the driver flywheel element 22 and the friction ring 90. The plate spring 96 biases the friction ring 90 against the friction blocks 88, and the friction blocks 88 against the radially extending wall 84 of the driver plate 40 of the driver flywheel element 22. The plate spring 96 presses the friction ring 90 and the driven plate 40 together.

Figure 5:
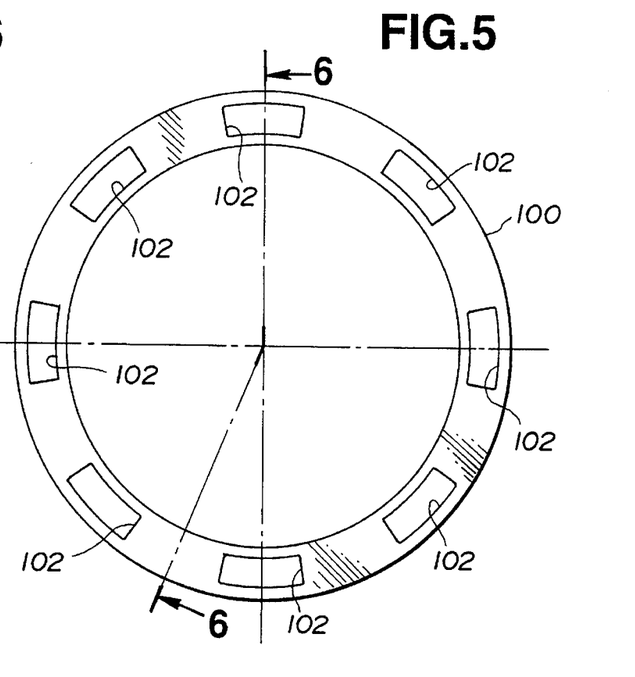
FIG. 5 is an elevational view of a floating ring used in the flywheel in FIG. 1.
Figure 6:
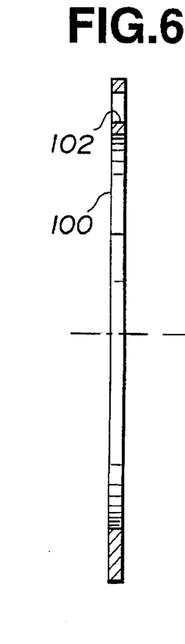
FIG. 6 is an axial section taken through the line 6—6 in FIG. 5.

The friction generating device 82 comprises means 98 for restricting at least circumferential relative mobility of the friction blocks 88 to each other. The restricting means 98 includes a floating type ring 100 which surrounds the collar portion 50 and is disposed between the interior circumference portion of the annular disc 44 and the friction ring 90. As seen in FIGS. 2 and 5, the floating ring 100 has windows 102 receiving the friction blocks 88. The friction blocks 88 have, within the windows 102, no play in the circumferential direction of the disc 44. Preferably, the restricting means 98 includes a second floating type ring 104. Similarly to the floating ring 100, the floating ring 104 surrounds the collar portion 50, but it is disposed between the interior cicumference portion of the annular disc 44 and the radially extending wall 84 of the driver plate 40. Similarly to the floating ring 100, the floating ring 104 has windows receiving the friction blocks 88. The friction blocks 88 have, within the windows of the floating ring 104, no play in the circumferential direction of the disc 44. The floating rings 100 and 104 have identical construction and constitute the restricting means 98 in the embodiment shown in FIGS. 1 to 6. As best seen in FIGS. 5 and 6, the floating ring 100 have eight of such windows 102.

The floating rings 100 and 104 are not pressed against the disc 44. The floating ring 100 is out of contact with or at least not pressed against the friction ring 90. Similarly, the floating ring 104 is out of contact with or at least not pressed against the radially extending wall 84. Therefore, this friction blocks and ring assembly can stay rotatable with the driver flywheel element 22 during rotational movement of the driven flywheel element 24 relative to the driven flywheel element 22 when there is the movement play of the friction blocks 88 within the windows 86 in the disc 44 (see FIG. 4). During this movement of the flywheel elements 22, 24, the spring arrangement 26 offers an increasing resistance to the movement.

As soon as the disc 44 of the driven flywheel element 24 is rotated relative to the driver flywheel element 22 far enough to consume the movement play of one or each of the friction blocks 88 in the corresponding window 86, the disc 44 of the driven flywheel element 24 entrains all of the friction blocks 88 in its further movement. During the further movement of the driven flywheel element 24 relative to the driver flywheel element 24, the frictional resistance counteracts the movement of the disc 44 relative to the driver plate 40 and the friction ring 90 in addition to the resistance offered by the spring arrangement 26.

The relative movement of the friction blocks 88 is prevented by the floating rings 100, 104. This assembly ensures that all of the friction blocks 88 thereby begin to offer frictional resistance at the same moment when the disc 44 entrains one of the friction blocks 88.

All of the friction blocks 88 are made of the same frictional material, while the floating rings 100, 104 are made of non-fricional material. In the market, the frictional material is relatively expensive. Thus use of non-frictional material, which is less expensive, thereby contributes to a reduction of manufacturing cost of the friction generating device 82.

The friction blocks 88 are press fitted into the windows of the floating rings 100, 104. All or part of the friction blocks 88 can be replaced with different friction blocks if the manufacture desires to change the frictional damping action of the device 82.

Figures 7, 8:
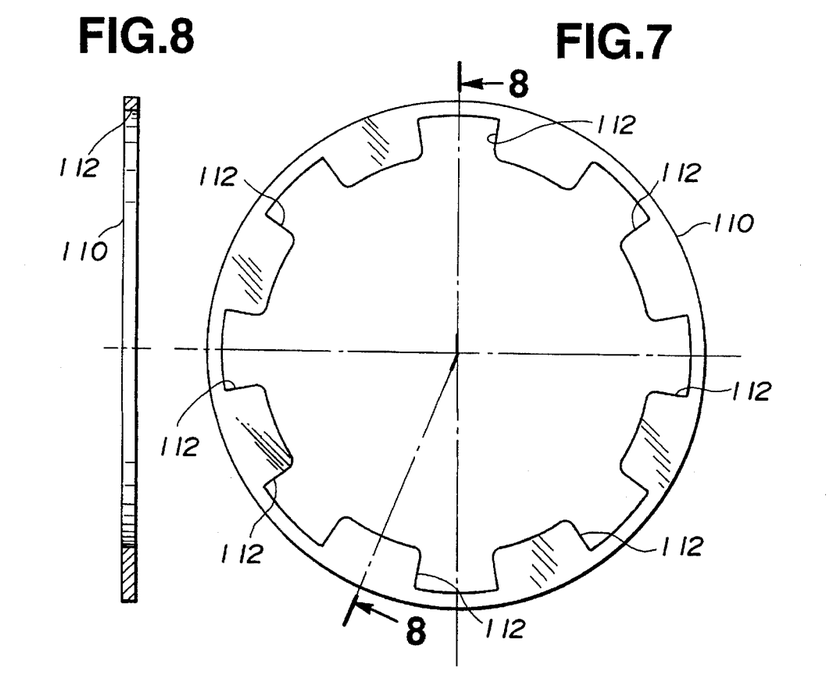
FIG. 7 is an elevational view of another form of a floating ring.
FIG. 8 is an axial section taken through the line 8—8 in FIG. 7.

The design of the floating ring 100 or 104 as illustrated in FIGS. 5 and 6 is just an example. The windows 102 may be replaced with radial cutouts. FIGS. 7 and 8 show an alternative design of a floating type ring 100 having radial cutouts 112 for receiving friction blocks 88.

In operation of the friction generating device 82, the disc 44 directly strikes, by its edge defining the window 86, the corresponding friction block 88. Repeated occurrence of this event may lead to damage or wear of the friction blocks 88.

Figures 9, 10, 11, 12:
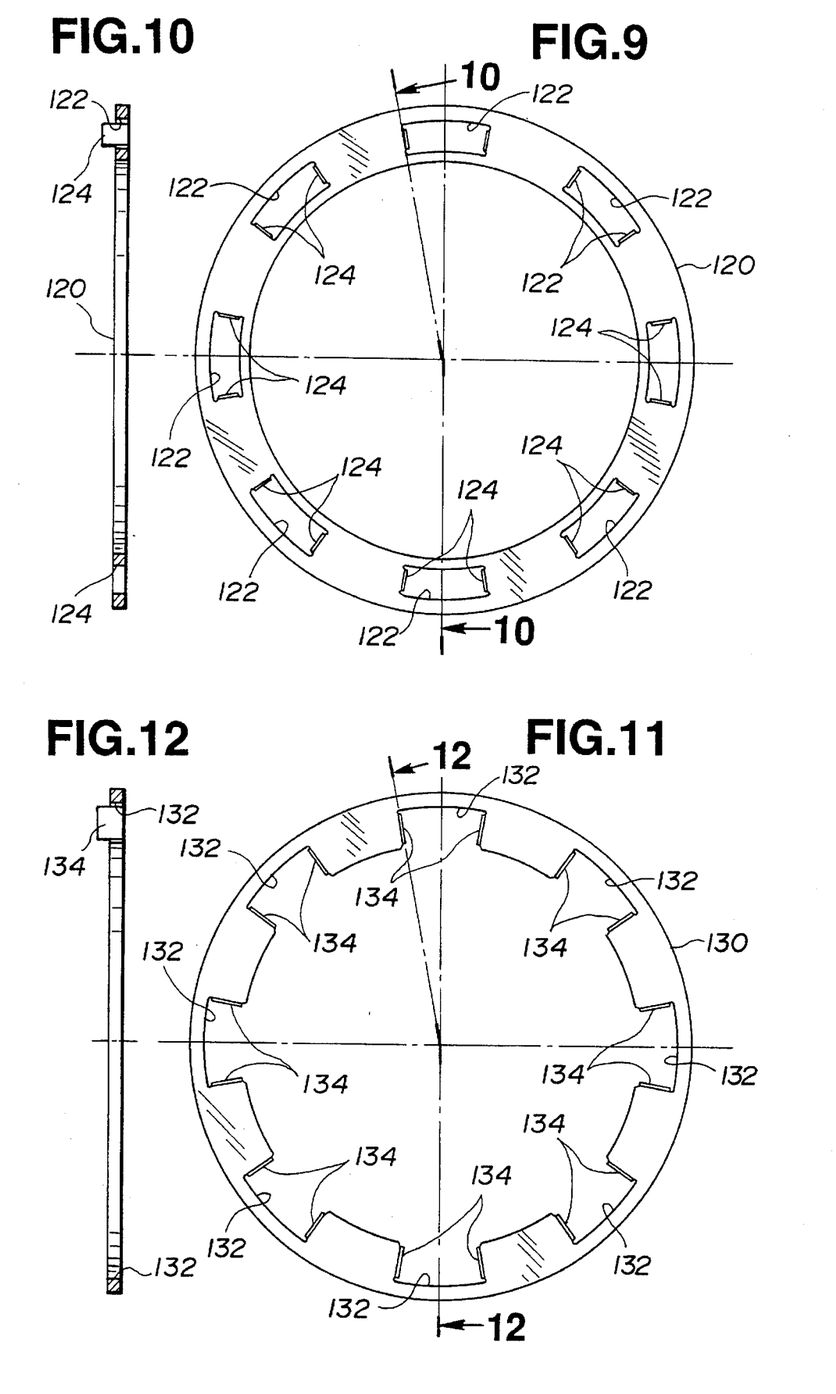
FIG. 9 is an elevational view of a third form of a floating ring.
FIG. 10 is an axial section taken through the line 10—10 in FIG. 9.
FIG. 11 is an elevational view of a fourth form of a floating ring.
FIG. 12 is an axial section taken through the line 12—12 in FIG. 11.

This problem is solved or at least alleviated by replacing one or both of the floating type rings 100, 104 with a floating type ring 120 having windows 122 receiving friction blocks 88 (see FIGS. 9 and 10). The floating ring 120 has a set of shield lugs 124 extending axially from the leading and trailing edges of each of the windows 122. The set of shield lugs 124 of each of the windows 122 has the corresponding friction block 88 interposed therebetween and are disposed in the corresponding one of windows 88 in the disc 44. In operation, the disc 44 strikes the shield lugs 124, thus avoiding direct contact with the friction blocks 88.

FIGS. 11 and 12 show a floating type ring 130 having radial cutouts 132 for receiving friction blocks 88. The floating ring 130 has a set of shield lugs 134 extending axially from the leading and trailing edges of each of the radial cutouts 132. The set of shield lugs 134 has interposed therebetween the corresponding one friction block 88 and are disposed in the corresponding one of windows 86 in the disc 44. The function of the floating ring 130 is the same as the function of the floating ring 120.

What is claimed is:

1. A flywheel comprising:

first and second flywheel elements rotatable about an axis, said first flywheel element having a radially extending wall, said second flywheel element having a disc formed with a plurality of windows;

a spring arrangement operatively disposed between and resiliently coupling said first and second flywheel elements;

a friction ring rotatable with said first flywheel element and maintained firmly against said first flywheel element for limited axial movement toward said radially extending wall;

a plurality of friction blocks interposed between said radially extending wall and said friction ring and received respectively within said plurality of windows, each of the friction blocks being arranged within a corresponding one of said plurality of windows with a play in a circumferential direction of said disc;

a spring acting on said friction ring to bias said friction ring against said plurality of friction blocks to keep said plurality of friction blocks in frictional contact with said radially extending wall and said friction ring;

a first floating ring disposed between said disc and said friction ring but out of driving contact with said friction ring and having a plurality of openings respectively receiving said plurality of friction blocks without any circumferential play to maintain said plurality of friction blocks in their relative circumferential positions and a second floating ring disposed between said disc and said radially extending wall but out of driving contact with said radially extending wall and having a plurality of openings respectively receiving said plurality of friction blocks without any circumferential play to maintain said plurality of friction blocks in their relative circumferential positions.

2. A flywheel as claimed in claim 1, wherein said plurality of openings of each of said first and second floating rings are a plurality of windows which are respectively provided in each of said first and second floating rings.

3. A flywheel as claimed in claim 2, wherein each of said first and second floating rings has a set of shield lugs extending axially from each of said plurality of windows.

4. A flywheel as claimed in claim 1, wherein said plurality of openings of each of said first and second floating rings are a plurality of cutouts which are respectively provided in each of said first and second floating rings.

5. A flywheel as claimed in claim 4, wherein each of said first and second floating rings has a set of shield lugs extending axially from each of said plurality of radial cutouts.

6. A drivetrain comprising:

an internal combustion engine including a crankshaft rotatable about an axis, said crankshaft having a central opening into which a bushing is received, said crankshaft defining an annular axial end around said central opening;

a torque converter including an input element having a protuberance rotatably received by said bushing, said input element extending radially outward with respect to said axis;

a driver annular plate and a side annular plate, each having radially innermost portions secured to said annular axial end of said crankshaft, said driver annular plate defining a radially extending wall, said side annular plate having an axially extending collar portion adjacent to the radially innermost portion thereof;

circumferentially spaced distancing elements disposed between said driver and side annular plates and adjacent radially outermost portions of said driver and side annular plates and fixedly securing said driver and side annular plates to each other with a predetermined distance maintained between said driver and side annular plates;

an annular disc disposed between said driver and side annular plates and having an inner periphery facing and opposed to said axially extending collar portion of said side annular plate, said annular disc having circumferentially spaces slots in which said circumferentially spaced distancing elements are respectively received;

circumferentially spaced fasteners affixing said annular disc to said input element at an outer periphery of said annular disc, said driver and side annular plates having openings in which said circumferentially spaced fasteners are respectively received, the openings preventing said driver and side annular plates from interfering with said fasteners;

said driver and side annular plates and said annular disc having windows registering with each other;

a spring retainer ring having a plurality of radially projecting arms each extending into a respective window of said annular disc;

a plurality of pairs of coil springs, each pair being received in each of said windows of said annular disc and separated by a respective one of said plurality of radially projecting arms, each pair being also received by the respective windows of said driver and side annular plates;

a friction ring rotatable with and maintained firmly against said side annular plate for limited axial movement toward said radially extending wall;

said annular disc further including a plurality of friction block receiving windows facing said radially extending wall;

a plurality of friction blocks interposed between said radially extending wall and said friction ring and received respectively in said plurality of friction block receiving windows, each of the friction blocks being arranged within a corresponding one of said plurality of friction block receiving windows with a play in a circumferential direction of said annular disc;

a plate spring acting between said friction ring and said side plate to bias said friction ring against said plurality of friction blocks to keep said plurality of friction blocks in frictional contact with said radially extending wall and said friction ring; and means, out of driving contact with said friction ring, and said radially extending wall, for maintaining said plurality of blocks in their relative circumferential positions.

7. A drivetrain as claimed in claim 6, wherein said maintaining means include a first floating ring disposed between said annular disc and said friction ring but out of driving contact with said friction ring, and having a plurality of openings respectively receiving said plurality of friction blocks without any circumferential play to maintain said plurality of friction blocks in their relative circumferential positions; and a second floating ring disposed between said annular disc and said radially extending wall but out of driving contact with said radially extending wall, and having a plurality of friction blocks without any circumferential play to maintain said plurality of friction blocks in their relative circumferential positions.

8. A drivetrain as claimed in claim 7, wherein said plurality of openings of each of said first and second floating rings are a plurality of windows which are respectively provided in each of said first and second floating rings.

9. A drivetrain as claimed in claim 8, wherein each of said first and second floating rings has a set of shield lugs extending axially from each of said plurality of windows.

10. A drivetrain as claimed in claim 7, wherein said plurality of openings of each of said first and second floating rings are a plurality of cutouts which are respectively provided in each of said first and second floating rings.

11. A drivetrain as claimed in claim 10, wherein each of said first and second floating rings has a set of shield lugs extending axially from each of said plurality of radial cutouts.

* * * * *